(12) United States Patent
Koukan

(10) Patent No.: US 10,245,941 B2
(45) Date of Patent: Apr. 2, 2019

(54) VENT VALVE

(71) Applicant: Ibrahim Koukan, Cologne (DE)

(72) Inventor: Ibrahim Koukan, Cologne (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 14/354,790

(22) PCT Filed: Sep. 20, 2012

(86) PCT No.: PCT/EP2012/003920
§ 371 (c)(1),
(2) Date: Apr. 28, 2014

(87) PCT Pub. No.: WO2013/060404
PCT Pub. Date: May 2, 2013

(65) Prior Publication Data
US 2014/0305956 A1    Oct. 16, 2014

(30) Foreign Application Priority Data

Oct. 26, 2011   (DE) ..................... 10 2011 116 941

(51) Int. Cl.
*B60K 15/035* (2006.01)
*F16K 17/04* (2006.01)
(Continued)

(52) U.S. Cl.
CPC .. *B60K 15/03504* (2013.01); *B60K 15/03519* (2013.01); *F16K 17/04* (2013.01);
(Continued)

(58) Field of Classification Search
CPC ...... F16K 17/194; F16K 17/196; F16K 17/12; B60K 15/03519; B60K 2015/03263;
(Continued)

(56) References Cited

U.S. PATENT DOCUMENTS 4,310,145 A    1/1982  Wempe
5,253,668 A *  10/1993 Mills ................ B60K 15/03519
                                                 137/12
(Continued)

FOREIGN PATENT DOCUMENTS

DE    10209369 A1    6/2003
EP    0853014         7/1998
(Continued)

OTHER PUBLICATIONS

PCT International Search Report and Written Opinion dated Jun. 11, 2013, received in corresponding PCT Application No. PCT/EP12/03920, 9 pgs.
(Continued)

*Primary Examiner* — Robert Poon
(74) *Attorney, Agent, or Firm* — Grossman, Tucker, Perreault & Pfleger, PLLC

(57) ABSTRACT

The invention relates to a vent valve (1) for controlling the internal tank pressure of a fuel tank, having at least one valve housing (2) having at least one first connection (3) to the fuel tank and at least one second connection (4), which can be connected to a vent line leading to a fuel vapor filter. The vent valve (1) comprises at least one valve element, which is held in a valve seat (8) in a position in which it closes the first connection (3) by the force of gravity and/or by spring loading and, after a given pressure threshold is exceeded, is raised from the valve seat (8) and, when a given pressure threshold is undershot, returns to the initial position. The valve element and/or the valve element guide has/have at least one relief opening (10), which forms a bypass for a gap flow which arises, for example, during a return movement of the valve element.

6 Claims, 5 Drawing Sheets

(51) Int. Cl.
  *F16K 17/12* (2006.01)
  *F16K 24/04* (2006.01)
  *B60K 15/03* (2006.01)

(52) U.S. Cl.
  CPC .............. *F16K 17/12* (2013.01); *F16K 24/04* (2013.01); *B60K 2015/03256* (2013.01); *B60K 2015/03263* (2013.01); *B60K 2015/03296* (2013.01); *B60K 2015/03388* (2013.01)

(58) Field of Classification Search
  CPC ........... B60K 2015/03256; B60K 2015/03296; B60K 2015/03276
  USPC ................ 220/746; 137/513.5, 587, 247.21, 137/247.13, 449, 513.7, 625.29
  See application file for complete search history.

(56) References Cited

U.S. PATENT DOCUMENTS

| | | | |
|---|---|---|---|
| 5,595,209 A | 1/1997 | Atkinson et al. | |
| 5,666,989 A | 9/1997 | Roetker | |
| 5,687,778 A | 11/1997 | Harris | |
| 5,924,438 A | 7/1999 | Cimminelli et al. | |
| 6,102,070 A * | 8/2000 | Busin | F16K 17/10 137/488 |
| 6,206,057 B1 | 3/2001 | Benjey et al. | |
| 7,207,347 B2 | 4/2007 | Olshanetsky et al. | |
| 7,604,063 B2 * | 10/2009 | Mashburn | E21B 21/10 137/513.7 |
| 7,770,593 B2 | 8/2010 | Moses | |
| 8,011,378 B2 | 9/2011 | Lee et al. | |
| 8,054,627 B2 | 11/2011 | Glover et al. | |
| 8,286,658 B2 | 10/2012 | Devall | |
| 2003/0094204 A1* | 5/2003 | Cholod | F16K 17/0413 137/543.21 |
| 2004/0112437 A1* | 6/2004 | Hernandez | F16K 17/194 137/493.1 |
| 2006/0108000 A1 | 5/2006 | Kaneko et al. | |
| 2006/0192168 A1* | 8/2006 | Thompson | F16K 15/04 251/318 |
| 2006/0213553 A1 | 9/2006 | Mills et al. | |
| 2008/0011667 A1 | 1/2008 | Ruschke | |
| 2009/0293849 A1 | 12/2009 | Kito et al. | |
| 2011/0067392 A1* | 3/2011 | Cella | B60T 11/26 60/453 |

FOREIGN PATENT DOCUMENTS

| | | |
|---|---|---|
| GB | 2453837 | 4/2009 |
| JP | 2000199577 A | 7/2000 |
| JP | 2002098251 A | 4/2002 |
| JP | 2003240143 A | 8/2003 |
| JP | 2006044586 A | 2/2006 |
| TW | 462927 | 11/2001 |
| WO | 98/26204 | 6/1998 |
| WO | 2010/131099 | 11/2010 |

OTHER PUBLICATIONS

English language translation of Japanese Office Action dated Jul. 22, 2015, received in corresponding Japanese Application No. 2014-537507, 4 pgs.

"Fuel Vapor Systems—Roll Over Valves with Anti-Trickle Valve Feature", Eaton Corporation, 2005, Cleveland, Ohio.

Office Action from related Indian Appln. No. 3848/CHENP/2014, dated Dec. 5, 2018. English translation on Office Action.

* cited by examiner

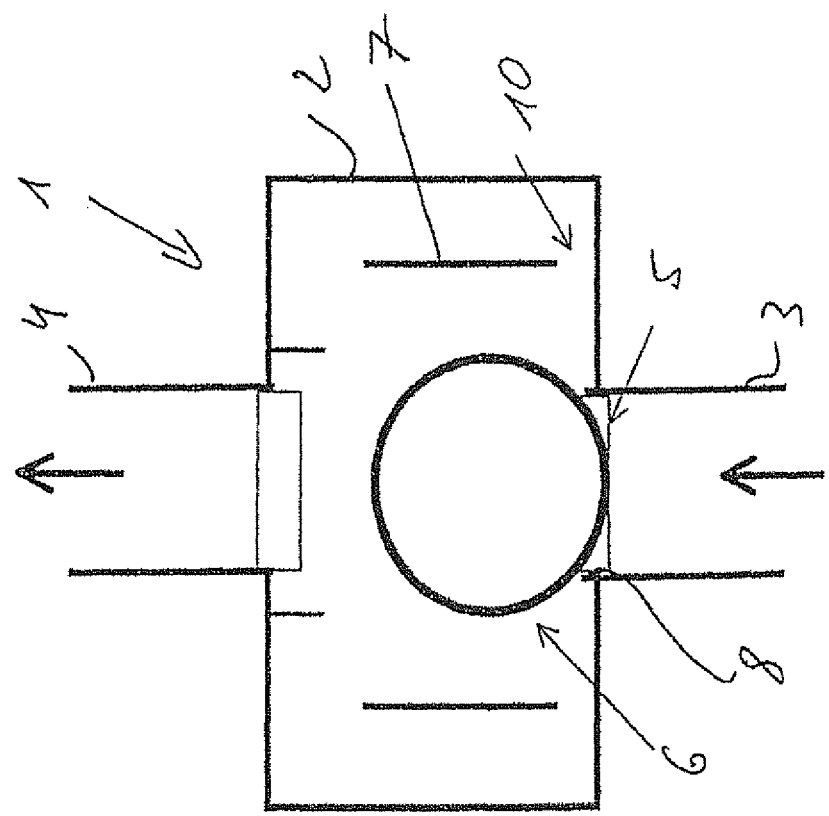

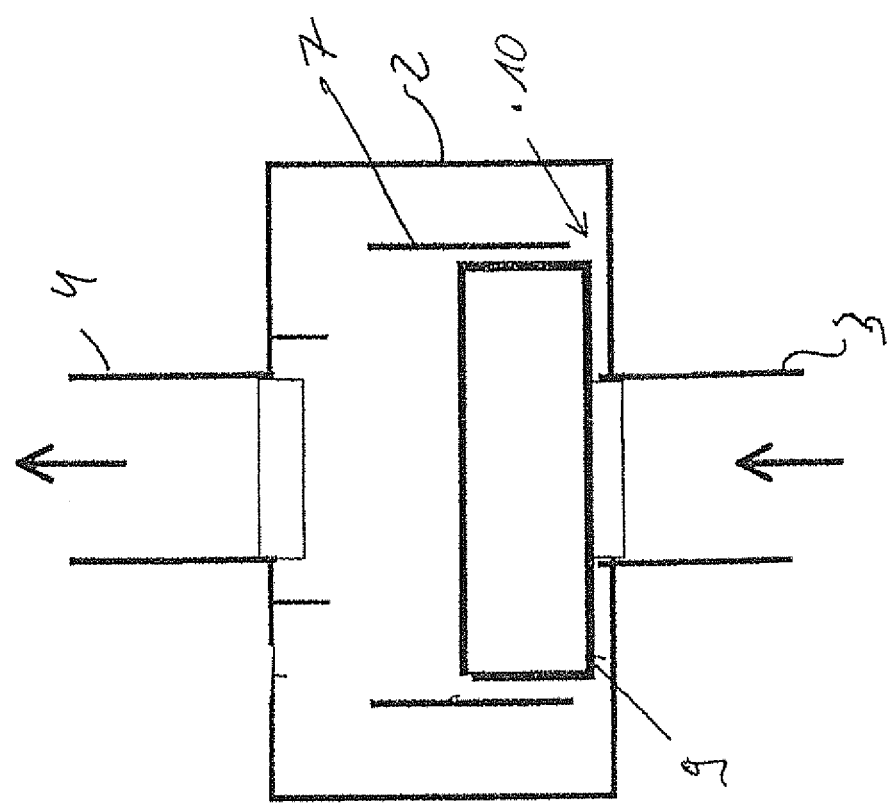

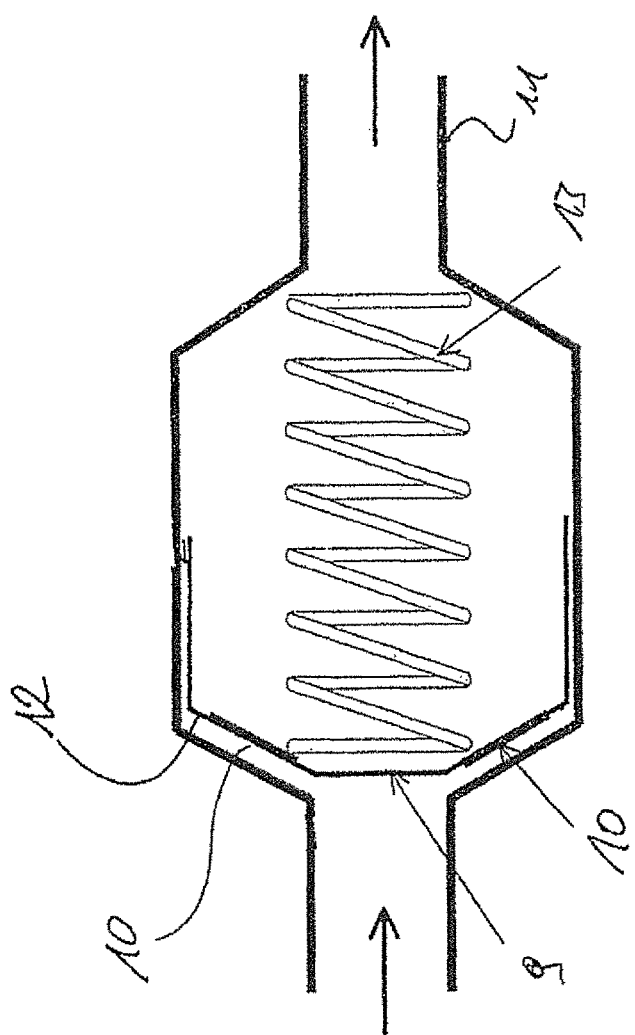

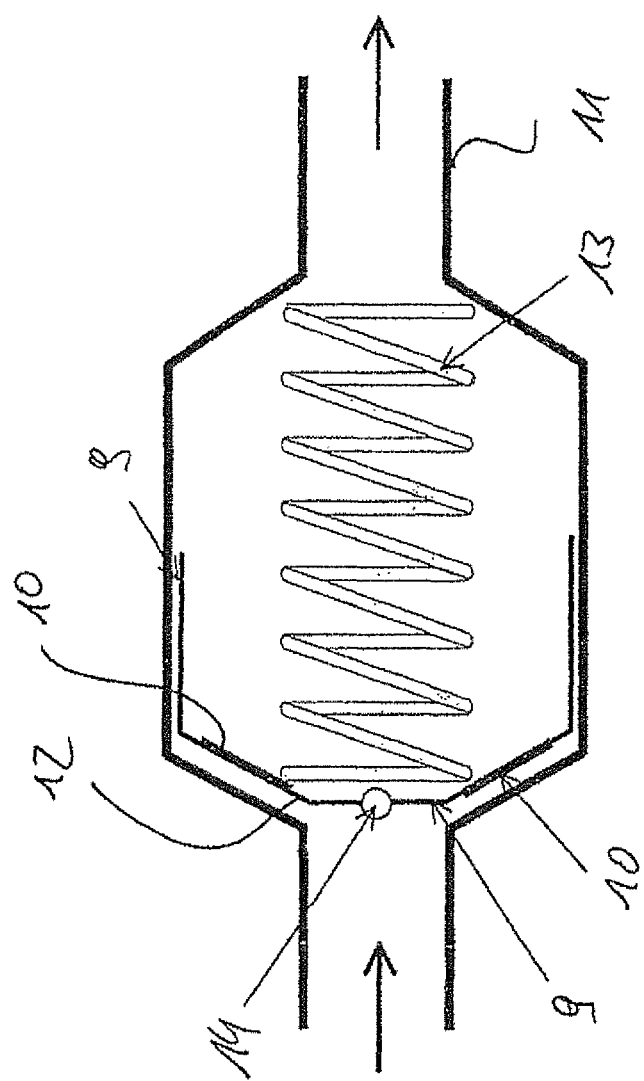

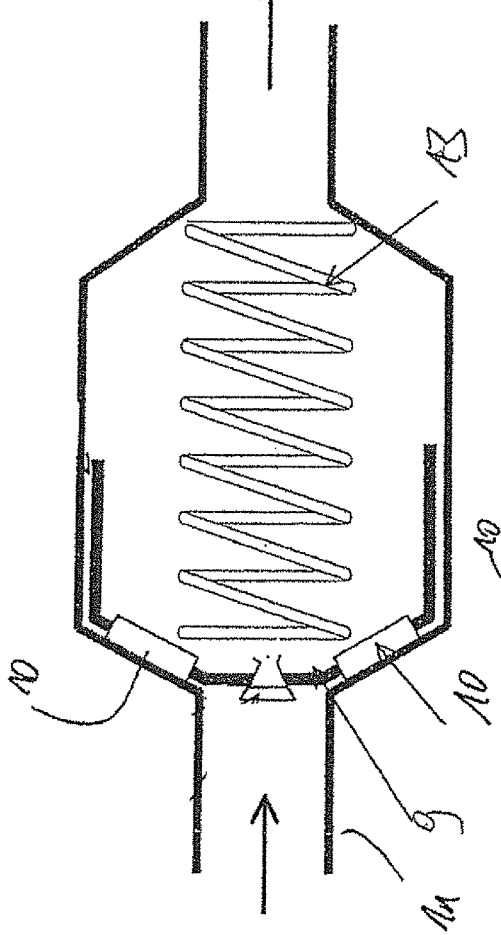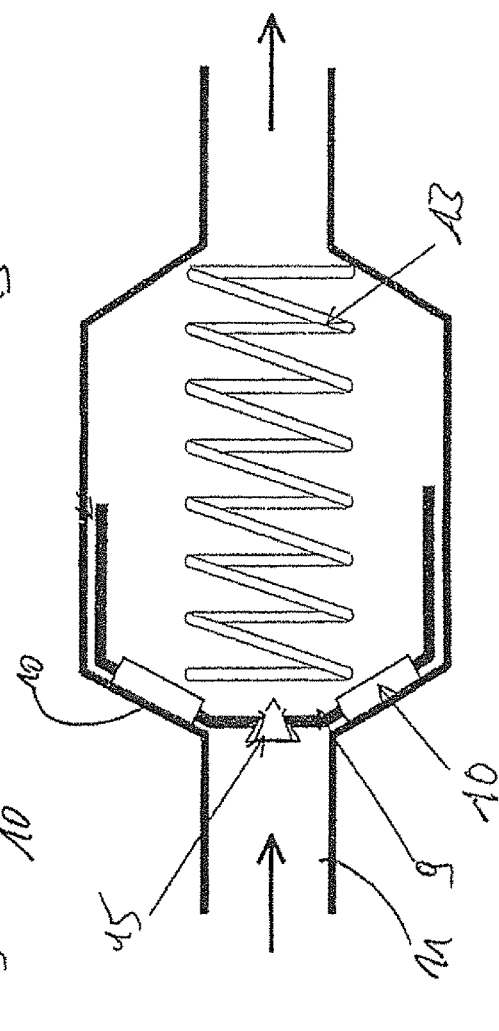

VENT VALVE

The invention relates to a vent valve for controlling the internal tank pressure of a fuel tank, having a valve housing having at least one first connection to the fuel tank and at least one second connection, which can be connected to a vent line leading to a fuel vapour filter, having at least one valve element, which is held in a valve seat in a position in which it closes the first connection by the force of gravity and/or by spring loading and, after a given pressure threshold is exceeded, is raised from the valve seat and, when a given pressure threshold is undershot, returns to the initial position, wherein the valve element is arranged so that it can move within a valve element guide.

Vent valves of this kind are also referred to as pressure holding valves or as vent valves with a pressure holding function. Particularly in the case where the fuel tank is being refilled, they ensure that the fuel pump nozzle switches off when the predetermined fuel level in the tank is reached. In all non-refueling states of the motor vehicle, vent valves should allow venting of the tank to a virtually unpressurized state. This means that a very small differential pressure with respect to atmosphere should be possible in the fuel tank, both in the case of processes associated with driving dynamics and also in the case of large pressure fluctuations.

A vent valve of the type described above is designed either as a separate pressure holding valve or is integrated into a service vent valve of a venting system of a fuel tank.

The pressure holding function of or pressure control by the vent valve serves primarily to prevent overfilling. During the refilling of a motor vehicle fuel tank, the liquid level within the fuel tank continues to rise until it closes a refill vent valve, e.g. raises a float in the refill vent valve, which closes the relevant venting path. In order to prevent continued filling of the fuel tank beyond the filling level envisaged by the manufacturer, the pressure within the tank must be able to rise within certain limits when the refill vent valve responds, causing the liquid column within the filler pipe of the fuel tank to rise until it closes a snifter hole in the fuel pump nozzle. This results in immediate deactivation of the fuel pump nozzle.

The maximum fuel level in the fuel tank permitted when refilling is predetermined structurally in such a way that a compensating volume remains in the fuel tank. This compensating volume allows the fuel to expand in the tank due to the effects of temperature and ensures that the venting system of the fuel tank is not wetted by liquid fuel. Maintaining this compensating volume is indispensable for the reliability of operation of the venting system of a fuel tank. The fuel tank must therefore be designed in such a way that intentional overfilling by the user is as far as possible excluded. Such overfilling is also referred to as trickle filling. In general, this is achieved, after the filler pump nozzle has switched off during the filling process, by the user operating the fuel pump nozzle several times in succession at brief intervals in such a way that some of the compensating volume of the fuel tank is nevertheless filled. This is not necessarily problematic, particularly in the case of fuel tanks in which the compensating/outgassing volume of the tank is generously dimensioned.

In the case of modern passenger vehicles, however, there is an increasing requirement for design and arrangement of the individual components in a manner which is as far as possible optimized in terms of installation space. It is therefore desirable to dimension the compensating volume in the fuel tank so that it is as small as possible. For this purpose, however, it is necessary to improve the venting system of the fuel tank in respect of overfill protection.

It is therefore the underlying object of the invention to improve a vent valve of the type stated at the outset in respect of fill protection for a fuel tank.

The object underlying the invention is achieved by a vent valve for controlling the internal tank pressure of a fuel tank, having a valve housing having at least one first connection to the fuel tank and at least one second connection, which can be connected to a vent line leading to a fuel vapour filter, having at least one valve element, which is held in a valve seat in a position in which it closes the first connection by the force of gravity and/or by spring loading and, after a given pressure threshold is exceeded, is raised from the valve seat and, when a given pressure threshold is undershot, returns to the initial position, wherein the valve element is arranged so that it can move within a valve element guide. The vent valve according to the invention is characterized, in particular, in that the valve element and/or the valve element guide has/have at least one first relief opening, which forms a bypass for a gap flow which arises, for example, during a return movement of the valve element.

The invention is based on the realization that possible trickle filling during the refilling of a fuel tank is achieved by the user exploiting the switching hysteresis of the pressure holding valve during refilling.

Pressure holding valves of the type described above respond approximately at an excess pressure of 30 mbar within the fuel tank, that is to say they allow a pressure rise up to 30 mbar. If the vent valve responds during the refilling process, the valve element will not instantaneously re-close the inflow opening into the valve housing, and therefore closure of the system will take place only at a pressure significantly below the response pressure. Depending on the design of the valve, the switching hysteresis of the vent valve may be more than 10 mbar, and addition of extra fuel to the compensating volume of the tank is therefore possible in the intervening period, given repeated and persistent operation of the fuel pump nozzle.

In particular, the invention is based on the realization that more effective overfill protection is ensured particularly if the switching hysteresis of the vent valve is reduced. Given the relatively small pressure differences and small actuating forces for the valve element, the switching hysteresis of the vent valve is dependent, in particular, on the gap flow between the valve element and a valve element guide or the valve element housing. Surprisingly, it has been found that the switching hysteresis of the valve can be influenced in an advantageous manner if, in particular, the valve element and/or the valve element guide has/have at least one first relief opening, which forms a bypass for a gap flow which arises, for example, during a return movement of the valve element.

Surprisingly, a relief opening of this kind can be implemented in a particularly simple manner in terms of design.

A ball, a piston or a plate, for example, can be provided as a valve element. Particularly where the valve element is embodied as a piston or a plate, the gap flow is relatively critical and can vary depending on the permissible tilting or wobbling motion of the valve element.

In the case of refill venting systems of fuel tanks made of thermoplastics, it is advantageous to make all the valve components which move relative to one another from polyamide. Polyamide is very largely dimensionally stable in the presence of fuels and fuel vapours. However, the gap flows which arise nevertheless vary, depending on the actual component tolerances.

In the solution according to the invention, the switching hysteresis of the vent valve is decoupled from component tolerances. By means of the relief bore provided, the pressure loss during the return movement of the valve element to the initial position, i.e. into a position in which it blocks an inflow opening into the vent valve, is minimized. As a result, it is also possible to reduce the component tolerances between the valve element guide and the valve element, thereby, in particular, also minimizing rattling noises caused by any wobbling movement or rolling movement of the valve element.

A cylinder, for example, in which the valve element is arranged so that it can move axially, can be provided as a valve element guide.

It is expedient if the first relief opening in the valve element guide is arranged to the outside of the valve seat. It is, of course, possible for a plurality of relief openings, in the form of relief bores for example, to be provided.

One variant of the vent valve according to the invention is characterized in that the first relief opening is arranged approximately at the level of the valve seat or below the valve seat, in relation to the direction of flow through the valve.

As an alternative, provision can be made for the first relief opening to be provided in the valve element.

Fundamentally, it is desirable and advantageous for reasons connected with production engineering for identical valve housing to be provided for all the abovementioned pressure holding principles or types of valve element.

In one variant of the vent valve, provision is made for the valve element to have at least one second relief opening, which is open permanently in order to obtain forced leakage. The term "second relief opening" in the sense used in the present application is intended to mean a relief opening which is qualitatively different from the first relief opening. For example, the second relief opening can have a significantly smaller cross section than the first relief opening. On the vent valve according to the invention, a plurality of first relief openings (first type of relief opening) and of second relief openings (second type of relief opening) can be provided.

In another expedient and advantageous variant of the vent valve according to the invention, at least one second relief opening is provided, which is closed by means of a nonreturn valve acting counter to the direction of closing of the vent valve. This second relief opening is used to enable pressure compensation to be achieved if, for example, a vacuum arises in the tank.

If the valve element is designed as a piston-shaped cylindrical body with a conical sealing surface, for example, one or more relief openings can be provided within the piston directly in the region of the sealing surface of the piston, thus ensuring that the closing movement of the valve element causes a minimum pressure loss.

The invention is explained below with reference to two illustrative embodiments illustrated in the drawings, in which:

FIG. 1: shows a schematic sectional view through a vent valve according to a first illustrative embodiment of the invention, FIG. 2: shows a schematic sectional view through a vent valve according to a second illustrative embodiment of the invention, FIG. 3: shows a schematic representation of a vent valve according to a third illustrative embodiment of the invention, FIG. 4: shows a schematic representation of a vent valve according to a fourth illustrative embodiment of the invention, and FIGS. 5 and 6: show schematic representations of a vent valve according to a fifth illustrative embodiment of the invention.

The vent valve 1 according to the invention can be designed as a pure pressure holding valve or, alternatively, as part of a normal service vent valve with a roll-over function on a fuel tank. It comprises, for example, a valve housing 2 having a first connection 3 to a fuel tank (not shown) and a second connection 4, which can be connected to a vent line leading to a fuel vapour filter. The first connection 3 comprises a vent opening 5, which is either connected directly to the compensating volume of a fuel tank or to a vent line from the fuel tank. The valve housing 2 of the vent valve 1 can, for example, be connected directly to the tank wall of a fuel tank or can be welded thereto.

A valve element in the form of a ball 6 (first illustrative embodiment) is arranged within the valve housing 2, for example.

In the illustrative embodiment shown in FIG. 1, the ball 6 is arranged so as to be able to move freely in a tube section 7, which forms a valve element guide.

An encircling collar around the vent opening 5 is provided as a valve seat 8, and is closed by the ball 6 in the rest position. As the valve element, the ball 6 is held in the position in which it closes the vent opening 5 purely by virtue of its mass, i.e. by the force of gravity. The mass of the ball determines the closing force of the valve. The clear width of the tube section 7 is larger than the diameter of the ball 6 by an amount such that, when the fuel tank or the motor vehicle in which the latter is installed is in a tilted position or due to driving dynamics, deflection of the ball 6 out of the centre of the vent opening 5 as defined by the valve seat 8 is possible. By virtue of this possibility, the ball 6 partially exposes the cross section of the vent opening 5 when the vehicle is in a tilted position or when there is deceleration or acceleration of the vehicle, thus enabling pressure compensation to take place between the fuel tank and the surroundings.

In order to minimize the pressure loss in the event of a response of the vent valve 1 when the valve element, i.e. the ball 6, returns to the initial position thereof, in which it completely closes the vent opening 5, first relief openings (10) are provided at the edge in the tube section 7, approximately at the level of the valve seat 8, forming a flow bypass for the pressure loss caused by the valve element or ball 6, irrespective of the tilted position of the vehicle.

Owing to this simple and effective measure, the switching hysteresis of the vent valve 1 is significantly reduced.

In the variant of the vent valve 1 shown in FIG. 2, in which parts which are the same are provided with the same reference signs, the valve element is designed as a piston 9. The piston 9 is likewise arranged with play in the tube section 7, allowing it to perform a slight wobbling/tilting movement within the tube section 7. Since deflection of the piston 9 in a manner corresponding to that in the illustrative embodiment shown in FIG. 1 is not desired and not necessary, the size of the gap between the piston 9 and the tube section 7 is somewhat smaller than in the first illustrative embodiment. As a result, the pressure loss due to the valve element would normally be greater in the illustrative embodiment according to FIG. 2. Owing to the first relief opening 10 provided in the tube section 7, the switching behaviour of the piston is essentially independent of the gap flow which arises between the piston 9 and the tube section 7.

In the illustrative embodiment according to FIG. 2 too, the piston 9 can be held in the position in which it closes the vent opening 5 purely by the force of gravity.

As an alternative, it is possible to hold the piston 9 in the closed position by spring loading.

The piston 9 and the tube section 7 have mutually complimentary circular cross sections but, of course, the invention is not restricted to such a cross-sectional geometry.

It is also possible for a plate to be provided as a valve element instead of a piston 9.

In the variant of the vent valve 1 shown in FIG. 3, it is arranged in a vent line 11 as a pure pressure holding valve. Accordingly, the valve element is designed as a piston 9 loaded by a spring 13. The piston 9 has a conical sealing surface 12, which interacts with a funnel-shaped valve seat 8. In the region of the encircling sealing surface 12, the piston 9 is provided with first relief openings 10 in the form of bores, through which gas can flow as long as the sealing surface 12 is not in the valve seat 8, ensuring that the pressure losses associated with the piston 9 moving in the valve seat 8 are minimal. Another variant of the vent valve 1 according to the invention is shown in FIG. 4. The variant of the vent valve 1 illustrated in FIG. 4 corresponds to the variant of the vent valve shown in FIG. 3. Components which are the same are provided with the same reference signs. The variant of the vent valve 1 shown in FIG. 4 differs from that shown in FIG. 3 in that a second relief opening 14 is provided in the end face of the piston 9 and is permanently open. This relief opening 14 is embodied as a somewhat smaller relief bore and allows an intended small amount of leakage through the vent valve 1. Such leakage ensures that the liquid column in the feed pipe of the fuel tank falls after a certain time once the fuel pump nozzle is switched off. The delay is set in such a way that the user cannot immediately add more fuel. Moreover, the second relief opening 14 serves to compensate for any vacuum in the tank.

A fifth variant of the vent valve 1 according to the invention is illustrated in FIGS. 5 and 6. This fifth variant of the vent valve 1 corresponds essentially to the variant illustrated in FIG. 4, with the difference that a nonreturn valve element 15 is inserted into the second relief opening 14. This opens the second relief opening 14 if there is a vacuum in the tank, and closes it when there is excess pressure.

REFERENCE SIGNS

1 vent valve
2 valve housing
3 first connection
4 second connection
5 vent opening
6 ball
7 tube section
8 valve seat
9 piston
10 first relief opening
11 vent line
12 sealing surface
13 spring
14 second relief opening
15 nonreturn valve element

What is claimed is:

1. A vent valve to control internal tank pressure of a fuel tank, comprising:
   at least one valve housing having at least one first connection configured to provide fluid communication with the fuel tank and at least one second connection configured to provide fluid communication with a fuel vapour filter,
   at least one valve element seated by at least one of gravitational force and spring force in a valve seat in a position which completely closes the first connection,
   wherein the vent valve is operable such that, when a pressure from the fuel tank rises above a threshold pressure, the valve element is unseatable from the valve seat and, when the pressure from the fuel tank lowers below the threshold pressure, the valve element is returnable to the seated position,
   wherein the valve element is arranged to move within a valve element guide,
   wherein the valve element and the valve element guide are configured to permit a gap flow between the valve element and the valve element guide,
   wherein the valve element has at least one first relief opening, which forms a bypass for said gap flow, and
   wherein the first relief opening is arranged approximately at a level of the valve seat or below the valve seat in relation to the direction of flow through the valve, and
   wherein the valve element has at least one second relief opening, which is closed by a nonreturn valve acting counter to a direction of closing of the vent valve.

2. The vent valve according to claim 1, wherein the valve element comprises a ball, a piston or a plate.

3. The vent valve according to claim 1, wherein the valve element guide comprises at least one cylinder in which the valve element is arranged to move axially.

4. The vent valve according to claim 1, wherein the first relief opening is provided in a sealing surface of the valve element.

5. The vent valve according to claim 1, wherein the valve element has at least one second relief opening, which is open permanently.

6. The vent valve according to claim 1, wherein the valve element guide is formed by a portion of the valve housing.

* * * * *